United States Patent [19]
Freischlad

[11] Patent Number: 5,311,599
[45] Date of Patent: May 10, 1994

[54] METHOD AND APPARATUS FOR OPTICAL TESTING OF SAMPLES

[75] Inventor: Klaus Freischlad, Aalen, Fed. Rep. of Germany

[73] Assignee: Carl-Zeiss-Stiftung, Heidenheim, Fed. Rep. of Germany

[21] Appl. No.: 692,127

[22] Filed: Apr. 26, 1991

[30] Foreign Application Priority Data

Apr. 26, 1990 [DE] Fed. Rep. of Germany ......... 013309

[51] Int. Cl.⁵ .......................... G06K 9/60; G06F 15/70
[52] U.S. Cl. .......................................... 382/8; 356/376
[58] Field of Search .................. 356/345, 376, 371; 382/8

[56] References Cited

U.S. PATENT DOCUMENTS

| | | | |
|---|---|---|---|
| 4,768,881 | 9/1988 | Jüptner et al. | 356/347 |
| 4,791,584 | 12/1988 | Greivenkamp | 356/359 |
| 4,832,489 | 5/1989 | Wyant et al. | 356/359 |
| 5,133,601 | 7/1992 | Cohen et al. | 382/8 |

FOREIGN PATENT DOCUMENTS

0262089 9/1987 European Pat. Off. .
3600672 7/1987 Fed. Rep. of Germany .

OTHER PUBLICATIONS

Kazuyoshi Itoh, "Analysis of the Phase Unwrapping Algorithm," *Applied Optics*, vol. 21, No. 14, p. 2470, 1982.
Dennis C. Ghiglia et al., "Cellular-automata Method for Phase Unwrapping", *Journal of Optical Society of America*, vol. 4, No. 1, pp. 267–280, 1987.

*Primary Examiner*—Leo H. Boudreau
*Assistant Examiner*—Chris Kelley
*Attorney, Agent, or Firm*—Walter Ottesen

[57] ABSTRACT

Described are a method and apparatus for the optical testing of samples in which a camera records a plurality of images of an interferogram or a bar pattern. Phase values are determined for each image point of each camera record, and then differences between the phase values of adjacent points in each image line and column are computed in modulo $2\pi$. These differences for each image point are summed over the plurality of camera images. After a number of images sufficient to assure desired accuracy have been summed, a single discontinuity elimination is carried out. This permits the rapid averaging of measurements over the plurality of camera images in real video time and remarkably reduces the measuring time and statistical errors.

10 Claims, 2 Drawing Sheets

METHOD AND APPARATUS FOR OPTICAL TESTING OF SAMPLES

TECHNICAL FIELD

The invention relates to the type of optical testing where information relating to a sample being tested is in the form of a light pattern recorded by a video camera. The pattern is produced by interference or by distortion of a projected bar pattern, and the phase values at selected pixels of the recorded image are used to create a phase diagram or phase chart of the sample.

BACKGROUND

There are many well-known methods for the optical testing of samples. Interferometry is one of these methods.

For interferometric surface testing, beams of light from a source such as a laser are reflected by an object surface and by a reference surface and then superimposed in a manner such that they interfere with each other. This creates a brightness pattern containing information regarding deviations of the object surface from the reference surface. This brightness pattern is recorded by a camera.

Interferometric testing can also use transmitted light. That is, the light beam is divided into a measuring beam and a reference beam, and the measuring beam is passed through the transparent sample. The two paths of rays are then superimposed such that they interfere with each other, and the resulting brightness pattern is recorded by a camera.

Camera images of the brightness pattern are evaluated by, first, computing phase values for each image point recorded by the camera and, then, using those computed phase values to create a phase diagram or chart of the imaged sample. Several different methods are known for computing these phase values. A good overview of a number of these methods, as well as their advantages and disadvantages, appears in a well-known thesis by B. Dorband (1986), University of Stuttgart.

When information is in the form of periodic brightness patterns, the phase value of the relative brightness recorded for a particular image point can only be computed in modulo $2\pi$, i.e., to an unknown integral multiple of the number $2\pi$. If this unknown integral multiple is set equal to zero, and even if it is assumed that the sample surface is not irregular, so-called "discontinuities" (sudden changes) occur in the phase images. At such discontinuities, the difference between the computed phase values of adjoining points has an absolute value greater than the number $\pi$. In order to determine the contours of the sample surface (or the deviations of the sample from a reference element), the integral multiple of $2\pi$ must be determined, i.e., the so-called discontinuity must be eliminated.

One known method of discontinuity elimination has Abeen described by K. Itoh, *Applied Optics*, Vol. 21, No. 14, page 2470 (1982). In the first step of this method, the differences between the phase values of adjacent points of a camera image are computed. Based on the sampling theorem, these quantitative differences must be less than $\pi$ in order to identify those discontinuities in which the difference is quantitatively greater than $\pi$. Therefore, where such discontinuities occur, the number $2\pi$ is added to or subtracted from the differences in such a manner that the corrected differences between the phase values range between $-\pi$ and $+\pi$ and, thus, are expressed in terms of modulo $2\pi$. By integrating these modulo $2\pi$ phase differences over the phase image, ultimately a phase chart with corrected discontinuities is attained. For such a phase chart, the integral multiple of the number $2\pi$ has been determined and, therefore, deviations of the object surface from the reference surface (or of the sample from a reference element) can be computed clearly.

Numerous other publications, among them German Patent No. DE-OS 36 00 672 and European Patent No. EP 0 262 089, have disclosed measuring systems in which a bar pattern is projected onto the object surface and the projected bar pattern is recorded by a camera. The contours of the object surface lead to a deformation of the bar pattern recorded by the camera. The evaluation of the camera image is analogous to the evaluation of an interferometrically generated brightness pattern. Namely, the brightness of each point of the camera image is first used to compute a phase value of the bar pattern, and then the calculated phase values are composed to form a phase image. However, this phase image also has discontinuities because, in turn, these phase values can be computed only up to an integral multiple of the number $2\pi$.

In such testing systems, statistical measuring errors which are caused, for example, by detector noise or air turbulences in the optical paths can be reduced by averaging many individual measurements. However, the computed phase values cannot be averaged before the discontinuities are eliminated. The reason for this is that the sampling theorem, after averaging, can no longer be used to identify discontinuities. Therefore, K. Itoh notes in his above-cited paper that averaging can only be done by using phase charts from which discontinuities have already been eliminated.

Unfortunately, the computation of phase charts from which discontinuities have been removed, i.e., eliminated, is a relatively time-consuming process, since each point of the phase image requires at least one integration. This computational effort is substantially greater if the initially computed phase values are tested among each other at different points of the phase image and, in addition, are checked as to their consistency relative to each other, as has been described in *Journal of the Optical Society of America*, Vol. 4, No. 1, page 267 (1987). When averaging, this use of time increases in proportion to the number of phase images used for averaging. Therefore, in order to achieve a distinct reduction in statistical errors, very long measuring and computation times are required because statistical errors, as is well known, decrease inversely proportional to the square root of the number of averaged phase images.

The present invention provides a measuring system which, while similar to those just described above, permits the averaging of a plurality of phase images (to achieve a desired reduction in statistical errors) in a remarkably shorter time.

SUMMARY OF THE INVENTION

The invention disclosed herein achieves a remarkable reduction in the time required to make statistically desirable testing measurements by (a) recording a plurality of separate images of the light pattern information; (b) calculating the differences, in modulo $2\pi$, between the phase values of adjacent image points in each of said separate recorded images; and then (c) summing those phase value differences for said plurality of images, this summing being carried out prior to the discontinuity elimination computation. That is, this summing of the phase value differences occurs prior to determining the integral multiple of said $2\pi$ differences and, therefore, prior to composing a phase chart.

This contrasts with the prior art methods in which the discontinuity elimination is computed for each respective recorded image to create a respective phase chart for each respective recorded image and, only thereafter, are these respective phase charts summed to create the desired final test measurement. The present invention computes and sums the phase value differences between neighboring image points in each recorded image in video real time, and then the time-consuming discontinuity elimination computation is carried out only once (by integrating the summed differences over the raster of image points).

Thereafter, the integrals are preferably normalized for each data point by the number of summed images. By normalizing after computations for all summed images are completed, the rounding errors that occur during normalization cannot propagate, and the final phase chart averages the correct contour of the object surface. Further, and most importantly, as will be described in greater detail hereinafter, the time required to carry out the novel procedure of the subject invention is only a small fraction of the time required by known methods.

The inventive method may be used when the pattern recorded by the camera is an interferogram and the measuring beam may be either reflected by the surface of the sample or transmitted by a transparent sample. However, the pattern recorded by the camera may also represent a periodic brightness distribution (bar pattern) projected on the sample, said brightness distribution being recorded in transmission or in diffuse reflection by the camera.

Moreover, the camera can record the light pattern along a single image line or along a plurality of lines. Of course, the time savings attained with the invention are substantially greater in the latter case, i.e., where a two-dimensional image is recorded, because the number of data points being evaluated is substantially greater.

If the camera records a light pattern along a plurality of lines, the evaluation takes place on a two-dimensional raster of data points; and the differences between the phase values of adjacent data points in lines, as well as the differences between the phase values of adjacent data points in columns, are determined and expressed in terms of modulo $2\pi$. This process is repeated depending on the number of phase images which must be used to obtain the desired statistical accuracy; and the differences of the phase values of adjacent data points (in both lines and columns), expressed in modulo $2\pi$, are computed for each phase image, being added to the appropriate current values determined for each previous image.

In order to create the phase chart, path integrals are computed by way of these summed differences between the phase values, and the values of the path integrals are divided by the number of summed camera images.

The summing or averaging of the differences between the phase values is preferably carried out by a computer program; and when the method of the invention is carried out by digital electronic hardware such as that described below, it is distinguished by particularly high speed.

In a simpler embodiment of the invention, such hardware comprises a camera which records the light intensity pattern along a straight line of image points. The output signals of the camera at each image point are read out at a predetermined frequency and digitized. The digitized output signals are used to compute the phase values which are fed to the two inputs of a differentiator. A delay line is provided in one of the two inputs of the differentiator, delaying the signal fed to this input by one period of the read-out frequency. This delay causes the phase values of adjacent data points to be subtracted from each other. The modulo $2\pi$ operation used to determine this difference can be carried out easily with hardware because the output signals of the differentiator have the same data width as the input signals. Thereafter, these differentiator output signals are transformed to a greater data width in one input of an adder. This adder adds the differences between the phase values, expressed in modulo $2\pi$, to the differences already in the memory, and the sum is stored in an image storage.

After the modulo $2\pi$ differences of the phase values for the desired number of phase images have been summed, the phase values are composed by means of an integration process in the form of a phase chart and displayed on a monitor.

In a preferred embodiment, the camera records a two-dimensional image; and, therefore, the differentiator, the adder, and the image storage are each duplicated. The second differentiator subtracts the phase values of adjacent data points in columns, while the second adder adds the differences between the phase values expressed in modulo $2\pi$ of the adjacent data points in columns to the differences already stored in the second image storage. The sum, in turn, is stored in the second image storage. Preferably, the differentiator and the adder consist of arithmetic logic units.

DRAWINGS

DETAILED DESCRIPTION

Figure 1A:
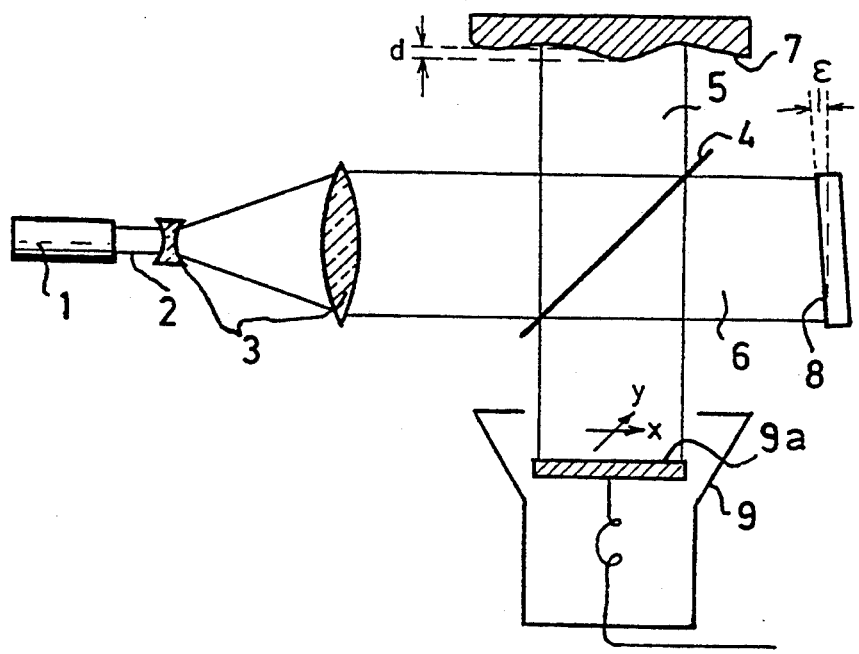
FIG. 1a is a schematic diagram of the optical path of an interferometric arrangement for measuring sample surfaces.

The arrangement of FIG. 1a comprises a laser (1), which produces a laser beam (2) that is expanded by a telescope (3). A beam splitter (4) deflects the expanded laser beam into an optical measuring path (5) and into an optical reference path (6). The light of optical measuring path (6) is reflected by the sample surface (7), and the light of optical reference path (6) is reflected by a reference mirror (8), the light from both paths being deflected by beam splitter (4) to the sensor (9a) of a CCD camera (9). Camera sensor (9a) records an interferogram of the light reflected by sample surface (7) and by reference surface (8). This interferogram contains information regarding deviations of the sample surface from the reference surface.

In order to generate a spatial carrier frequency ($f_o$), reference mirror (8) is inclined at a small angle ($\epsilon$) to optical reference path (6). The light intensity I(x,y) of the interferogram is determined by the interference equation $$I(x,y) = a(x,y) + b(x,y) \cos(2\pi f_0 x + w(x,y)).$$

In this equation: a(x,y) represents an apparatus-specific "constant" caused, for example, by diffuse light, irregular profile of laser beam (2), or a location-dependent sensitivity of camera sensor (9a); laterally different reflectivities of sample surface (7) and reference mirror (8) are expressed in terms of the location-dependent modulation b(x,y); and w(x,y) represents the phase values pertaining to the contours of sample surface (7). One contour having a value (d) results in a change of the phase value $\Delta w = 4\pi d/\lambda$, where $\lambda$ represents the wavelength of laser (1).

The phase values w(x,y) are computed for each point of the phase image by spatial Fourier transformation as described in the above-cited thesis by B. Dorband, and these phase values are thereafter composed to form an image.

The phase values can also be calculated by means of another method, namely, by "phase-stepping within the time frame" (also described by Dorband) in which a phase image is generated from several different camera images, between each of which the reference mirror (8) is shifted parallel to the optical axis. Although this latter method is slightly slower, greater accuracy can be attained.

Based on the $2\pi$ periodicity of the light intensities I(x,y) of the interferogram, as expressed in the interference equation set forth above, the phase values w(x,y) can only be determined up to an integral multiple of the number $2\pi$. More accurately, the calculated phase values range between $-\pi$ and $+\pi$. If the phase difference between the two interfering optical paths (5,6) exceeds the number $\pi$ at some point, the calculated phase image for that point exhibits a "discontinuity" in which the difference between the phase values w(x,y) of adjacent points of the phase image has an absolute value greater than $\pi$.

Figure 1B:
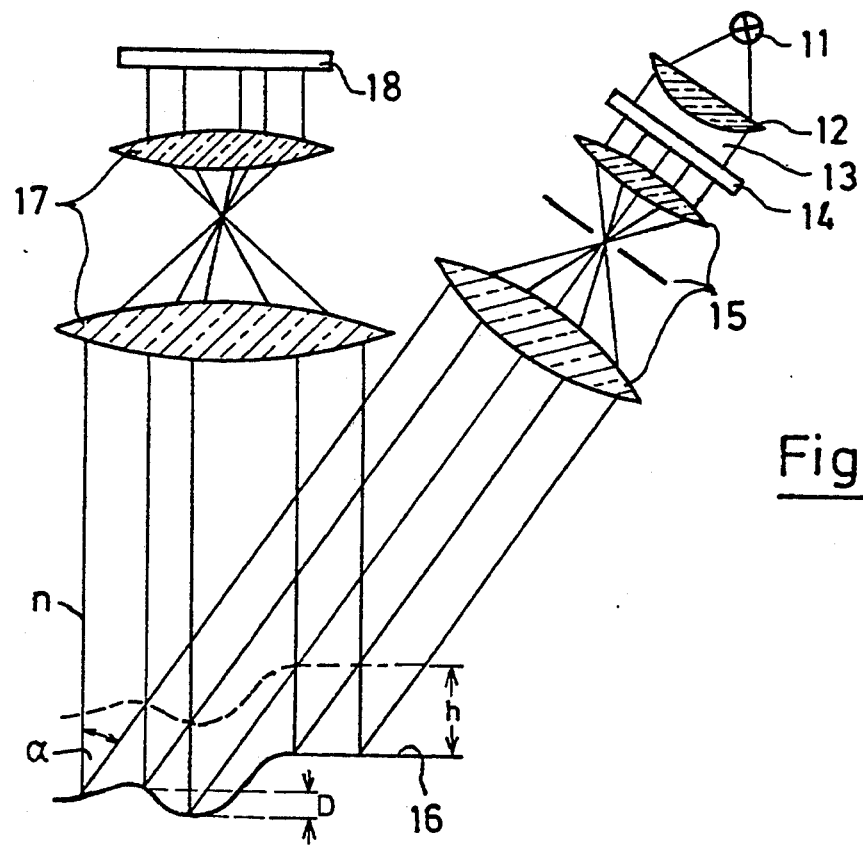
FIG. 1b is a schematic diagram of the optical path of an arrangement for measuring sample surfaces by means of a periodic brightness pattern projected on the sample surface.

The arrangement shown in FIG. 1b comprises a condenser (12) which generates a parallel optical path (13) for the light from a light source (11). Parallel light beam (13) passes through a grating (14) with cosinusoidal transmission characteristics. Light beam (13), which is spatially modulated by grating (14), is projected through a spatial frequency filter (15) onto the sample surface (16) in a telecentric manner and at an angle ($\alpha$) relative to the normal (n) of sample surface (16). A telecentric optical receiving system (17) is perpendicular to sample surface (16), and a camera (18) records an image of the periodic brightness pattern projected on sample surface (16).

The contours of sample surface (16) cause a deformation of the bar pattern. Namely, depending on the topography of sample (16), the points of equal light intensity are at greater or smaller distances from camera (18), and the degree of deformation of the bar pattern is a function of the angle ($\alpha$).

The image recorded by camera (18) does not change when sample (16) is shifted perpendicular to its surface normal (n) by an integral multiple of the contour interval (h). Therefore, in evaluating the camera image, the contours of sample surface (16) can only be determined up to an integral multiple of the contour interval (h). Analogous to the interferometric system of FIG. 1a, the contours of sample surface (16) of the depth (D) are associated with the bar phases $\Delta w_s = 2\pi D/n$. As in interferometry, the bar phases recorded by camera (18) can be computed only up to an integral multiple of the number $2\pi$.

Figure 2:
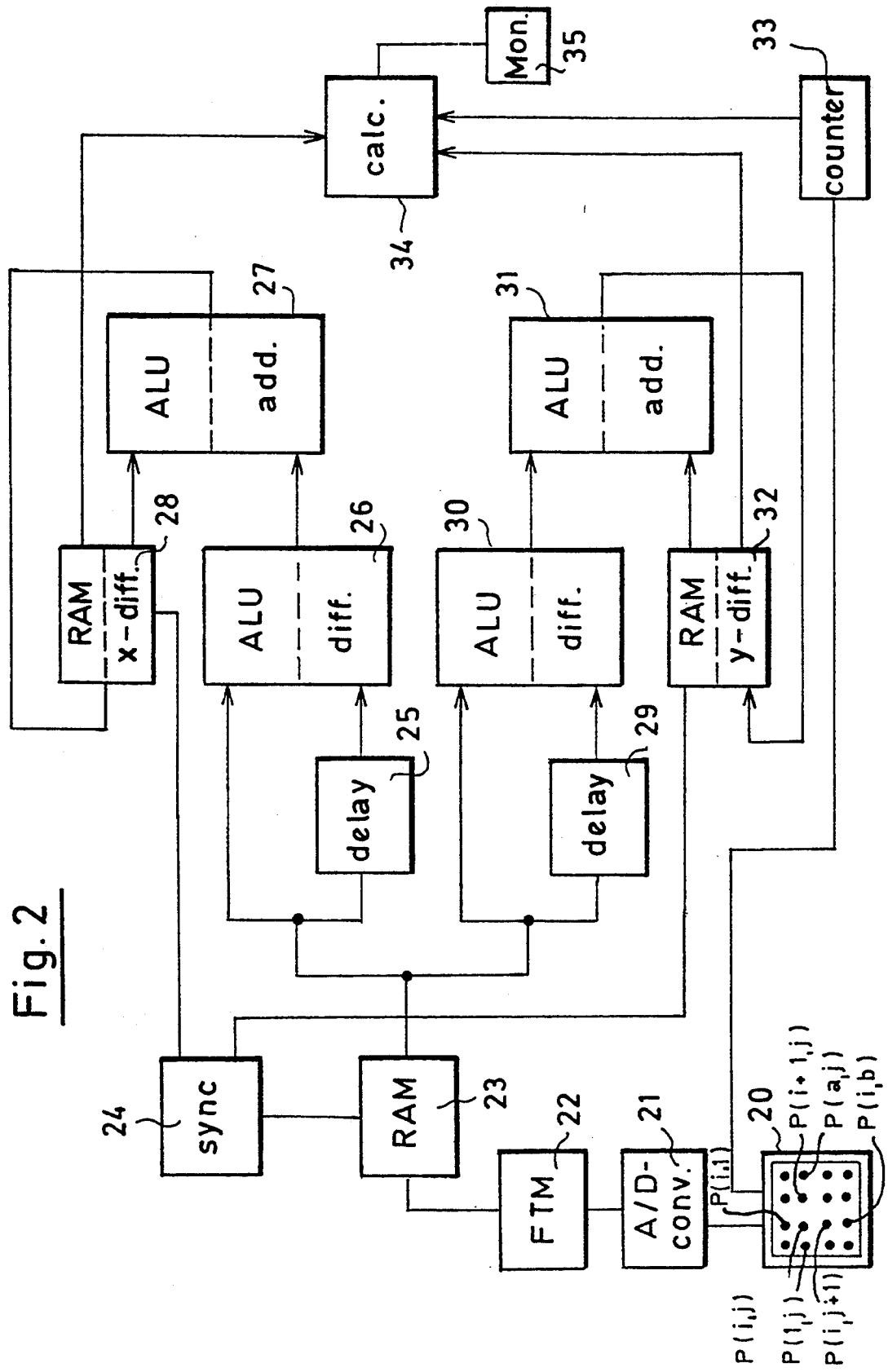
FIG. 2 is a block circuit diagram of digital electronic hardware arranged according to the present invention for evaluating a two-dimensional pattern recorded by a camera.

Referring now to the electronic apparatus of the invention shown in block diagram form in FIG. 2, CCD camera (20) represents either camera (9) of FIG. 1a, or camera (18) of FIG. 1b, since the novel method of the invention can be used when testing samples interferometrically or when the testing information is created by projected bar patterns. In the preferred embodiment, camera (20) records the images of the light pattern on a two-dimensional sensor whose raster of (a×b) image points ($P_{(i,j)}$) is arranged in "a" number of columns and "b" number of lines.

Camera (20) has a total of 512 lines and 512 columns, of which only 4 lines and 4 columns are shown, to simplify the illustration. The intensity values measured at the data points ($P_{(i,j)}$) are digitized in an analog-to-digital converter (21) to an 8-bit data width. The digitized intensity values are then delivered to a computing unit (22) where, following spatial Fourier transformation, they are used to compute corresponding phase values up to an integral multiple of the number $2\pi$. All of these phase values range within the interval $-\pi$ and $+\pi \cdot (1 - 1/128)$. The Fourier transformation is described in the above-cited, well-known thesis by B. Dorband.

The phase values $w(P_{(i,j)})$ of each image point are stored as a phase image in a RAM buffer (23). Ram (23) is read out serially, at a fixed frequency set by a synchronization unit (24); and the phase values $w(P_{(i,j)})$ are fed to the two inputs of a first ALU (arithmetic logic unit) (26). ALU (26) is designed as a differentiator, i.e., it generates the difference between the two input signals.

One of the two inputs of ALU (26) contains a delay line (25), the delaying effect of which is equal to one period of the frequency given by synchronization unit (24). Therefore, ALU (26) subtracts the phase values of two adjacent data points ($P_{(i,j)}$, $P_{(i+1,j)}$) of the same line of the camera (20).

The output signals of ALU (26) are represented in the same data width (8 bits) as its input signals. Mathematically, this corresponds to a modulo $2\pi$ representation of the differences computed by ALU (26), i.e., the differences also have values between $-\pi$ and $+\pi \cdot (1 - 1/128)$. However, these differences are transformed to a 16-bit data width at the input of an adder, ALU (27).

The output signals of a first image storage, RAM (28), are fed to the second input of the addition ALU (27). These signals have a 16-bit data width and are added to the difference signals from ALU (26). RAM (28) is read out serially in synchronization with the buffer, RAM (23). The 16-bit data width output signals of ALU (27) are again stored in the first image storage, RAM (28).

Parallel to the first ALU (26) is a third ALU (30) which also is designed as a differentiator, and the output signals of buffer (23) are also fed simultaneously to the two inputs of ALU (30). However, one of the inputs of ALU (30) comprises a delay line (29), the delaying effect of which amounts to nearly a-times the period of the frequency of synchronization unit (24), wherein (a) represents the number of data points in a line of the camera (20). Therefore, ALU (30) generates the difference between the phase values of two adjacent points ($P_{(i,j)}$, $P_{(i,j+1)}$) of the same column of the camera (20).

Similar to the above-described signals related to adjacent line points, the output signals of ALU (30) have the same 8-bit data width as its input signals, i.e., the computed differences between the adjacent columnar phase values are also expressed in modulo $2\pi$ and are thereafter transformed to 16-bit data width in the input of another adder, a fourth ALU (31).

The output signals of a second image storage, RAM (32), have a 16-bit data width and are fed to the second input of ALU (31). RAM (32) is also read out serially in synchronization with buffer (23), and the output signals of ALU (31) are similarly stored with a data width of 16 bits in the second image storage (32).

The image storage units, RAM (28) and RAM (32), have memory locations corresponding to each image point of camera (20). The memory location in RAM (28) associated with point $P_{(i,j)}$ stores the differences between the phase values for point $P_{(i,j)}$ and its adjacent point $P_{(i+1,j)}$ in the same line of the two-dimensional image of camera (20). Further, as additional images of the sample are recorded by camera (20), this same 16-bit memory location sums the phase value differences between these two points for all of the images recorded. Similarly, the memory location in RAM (32) associated with point $P_{(i,j)}$ stores the differences between the phase values for point $P_{(i,j)}$ and its adjacent point $P_{(i,j+1)}$ in the same column of the two-dimensional image of camera (20), and that 16-bit memory location sums the phase value differences between these two points for all of the images recorded.

The transformation of the originally digitized 8-bit data to a data width of 16 bits in both adders (27, 31) permits the averaging of up to 255 successive camera images without loss of information. A counter (33) counts the number of camera images used for averaging. As a result, statistical errors may be reduced to 1/16. Since this averaging is accomplished in video real time, the averaging over 255 camera images takes approximately 11 seconds.

However, even greater reduction of statistical errors is possible if both adders (27, 31) and the two image storages (28, 32) are designed for a data width greater than 16 bits. By designing these components to handle 24-bit data widths, an averaging over 216 images by camera (20) is possible. The statistical errors can then be reduced to 1/256.

Upon the completion of summing, a computer/calculator component (34) reads out the data stored in the two image storages (RAM 28 and RAM 32) and carries out a single discontinuity elimination by path integration. Since the evaluation occurs on a discrete raster of data points, each path integral corresponds to a summation. The final phase values computed by computer/calculator (34) are then divided by the number of camera images and composed in a phase chart which is displayed in the form of a graph on a monitor (35).

The computation time required for this discontinuity elimination is approximately 20 seconds. Therefore, with the invention herein, it is possible to produce a test measurement of a sample, averaged over 255 camera images, in only 31 seconds. This is remarkably faster than the known methods which, while using the same computation time for the discontinuity elimination, repeat this latter computation for each camera image and, therefore, in order to produce a test measurement based upon the same 255 camera images, would require almost 1.5 hours.

To state this remarkable improvement in another way, in the time required by known methods to carry out an individual measurement for the testing of a sample, my invention provides a measurement in which statistical errors are reduced by a factor of 16. Further, by using my invention, accurate serial testing can be integrated directly with sensitive production processes, and the time required for the discontinuity elimination (20 seconds with present electronic equipment) can be used to exchange one sample for another.

Frequently, the brightness patterns exhibit too low a contrast at individual points of the camera image. The cause for this could be unfavorable optical properties of the sample (for example, locally strong diffusion). When this occurs, it is usual to mask such image points, i.e., they are not considered during further evaluation. Also, when averaging several camera images, only those data points which remain unmasked in all of the images are used for final evaluation.

I claim:

1. Apparatus for optical testing of a sample in which information pertaining to the sample, in the form of light patterns recorded along a raster of image points, is evaluated as a plurality of phase images, the apparatus comprising:

a light source positioned to direct light at said sample to generate light pattern images that vary in relative brightness in accordance with information pertaining to said sample;

a camera having a raster of image points for separately recording a plurality of said light pattern images;

a computer that determines the phase values of a plurality of phase images in accordance with the relative brightness of said light pattern images as recorded at each image point along said raster of image points;

a differentiator that determines variations in the phase values of each said phase image by determining the differences, in modulo $2\pi$, between the computed phase values of adjacent image points, said differentiator having an output;

image storage means for storing said determined variations in the phase values of each said phase image as the differences between phase values determined by said differentiator, said image storage means having an input and an output; and an adder for generating the sum of (a) the differences between phase values of adjacent image points for a first one of said phase images and (b) the differences between the phase values for said same adjacent image points for a second one of said phase images, said adder having a first and a second input and an output said first input of said adder being connected to the output of said differentiator, said second input of said adder being connected to the output of said image storage means, and said output of said adder being connected to the input of said image storage means.

2. An interferometer for optically testing a sample, said interferometer comprising:

a light source for generating a light beam;

an optical measuring path and an optical reference path;

means for positioning said sample in said optical measuring path;

means for (a) deflecting said light beam both onto said sample in said optical measuring path and into said optical reference path, and (b) generating a light pattern image that varies in relative brightness in accordance with information pertaining to said sample, said image being generated by interference of the light from said optical measuring path and said optical reference path;

a camera having a raster of image points for separately recording a plurality of said light pattern images;

a computer than determines the phase values of a plurality of phase images in accordance with the relative brightness of said light pattern images as recorded at each image point along said raster of image points;

a differentiator that determines variations in the phase values of each said phase image by determining the differences, in modulo $2\pi$, between the computed phase values of adjacent image points, said differentiator having an output;

image storage means for storing said determined variations in the phase values of each said phase image as the differences between phase values determined by said differentiator, said image storage means having an input and an output; and an adder for generating the sum of (a) the differences between phase values of adjacent image points for a first one of said phase images and (b) the differences between the phase values for said same adjacent image points for a second one of said phase images, said adder having a first and a second input and an output; said first input of said adder being connected to the output of said differentiator, said second input of said adder being connected to the output of said image storage means, and said output of said adder being connected to the input of said image storage means.

3. Apparatus for optical testing of a sample, said apparatus comprising:
a light source for generating a light beam;
means for spatially modulating said light beam to generate a periodic brightness pattern;
means for projecting said periodic brightness pattern onto said sample;
a camera having a raster of image points for separately recording a plurality of images of said periodic brightness pattern generated by the projection of said modulated light beam onto said sample;
a computer that determines the phase values of a plurality of phase images in accordance with the relative brightness of said light pattern images as recorded at each image point along said raster of image points;
a differentiator that determines variations in the phase values of each said phase image by determining the differences, in modulo $2\pi$, between the computer phase values of adjacent image points, said differentiator having an output;
image storage means for storing said determined variations in the phase values of each said phase image as the differences between phase values determined by said differentiator, said image storage means having an input and an output; and
an adder for generating the sum of (a) the differences between phase values of adjacent image points for a first one of said phase images and (b) the differences between the phase values for said same adjacent image points for a second one of said phase images, said adder having a first and a second input and an output; said first input of said adder being connected to the output of said differentiator, said second input of said adder being connected to the output of said image storage means, and said output of said adder being connected to the input of said image storage means.

4. The apparatus of claim 1 wherein the camera has a two-dimensional recording surface and said raster of image points includes a plurality of lines and columns, and wherein said differentiator means determines the differences between the computed phase values for adjacent image points in each of said lines; said apparatus further comprising:
second differentiator means for determining the differences between the computed phase values for adjacent image points in each of said columns, said second differentiator means having an output;
second image storage means for storing the differences between phase values determined by said second differentiator means, said second storage means having an input and an output; and
second adder means for generating the sum of (a) the differences determined by the second differentiator means for a first one of said phase images and (b) the differences determined by the second differentiator means for a second one of said phase images, said second adder means having a first and second input and an output; said first input of said second adder means being connected to the output of said second differentiator means, said second input of said second adder means being connected to the output of said second image storage means, and said output of said second adder means being connected to the input of said second image storage means.

5. The apparatus of claim 4 wherein said first and second differentiator means and said first and second adder means comprise respective arithmetic logic units, and wherein said first and second adder means comprise respective RAMs.

6. The apparatus of claim 1, further comprising a calculator for reading out the data stored in said image storage means and for carrying out a single discontinuity elimination by path integration.

7. The apparatus of claim 6, wherein calculator functioning to divide said phase values by the number of camera images.

8. An apparatus for optically testing a sample in which information pertaining to the sample, in the form of a light pattern, is detected by a camera having a raster of image points and is evaluated along a raster of the image points, said apparatus comprising:
a light source for directing light at said sample to generate light pattern images that vary in intensity in accordance with information pertaining to said sample;
a camera for separately detecting each of said light pattern images and converting said images into respective electrical signals;
a computer receiving said electrical signals to process said signals to separately determine the relative brightness of each image point of each said separately detected image by computing a corresponding phase value, expressed in modulo $2\pi$, for each image point;

a differentiator to determine the differences in relative brightness between each said image point and its respective adjacent image points for each separately detected image by separately calculating the differences, in modulo $2\pi$, between the phase values of adjacent image points for each said separately detected image;

an adder for summing said separately-calculated phase value differences pertaining to the same individual image point as detected in each of said separately detected plurality of light pattern images and forming adder output signals; and, said computer receiving said adder output signals to determine the integral multiple of $2\pi$ of said phase values from said summed differences.

9. The apparatus of claim 8, further comprising an image store for storing said differences between said phase values; and, a calculator for reading out the data stored in said image store and for carrying out a single discontinuity elimination by path integration.

10. The apparatus of claim 9, said calculator functioning to divide said phase values by the number of camera images.

* * * * *

UNITED STATES PATENT AND TRADEMARK OFFICE
CERTIFICATE OF CORRECTION

PATENT NO. : 5,311,599

DATED : May 10, 1994

INVENTOR(S) : Klaus Freischlad

It is certified that error appears in the above-identified patent and that said Letters Patent is hereby corrected as shown below:

On title page, item [30] under "Foreign Application Priority Data": delete "013309" and substitute -- 4013309 -- therefor.

In column 1, line 58: delete "Abeen" and substitute -- been -- therefor.

In column 6, line 1: delete "$\Delta w_s = 2\pi D/n$" and substitute -- $\Delta w_s = 2\pi D/h$ -- therefor.

In column 7, line 47: delete "216" and substitute -- $2^{16}$ -- therefor.

In column 8, line 56: between "output" and "said", insert -- ; --.

In column 9, line 12: delete "than" and substitute -- that -- therefor.

In column 9, line 57: delete "computer" and substitute -- computed -- therefor.

UNITED STATES PATENT AND TRADEMARK OFFICE
CERTIFICATE OF CORRECTION

PATENT NO. : 5,311,599

DATED : May 10, 1994

INVENTOR(S) : Klaus Freischlad

It is certified that error appears in the above-identified patent and that said Letters Patent is hereby corrected as shown below:

In column 10, line 48: delete "wherein" and substitute -- said -- therefor.

Signed and Sealed this

Sixth Day of September, 1994

Attest:

BRUCE LEHMAN

Attesting Officer

Commissioner of Patents and Trademarks